(No Model.)

R. ROUTH, W. J. DWYER & O. R. ROUTH.
ELASTIC TIRE FOR VEHICLES.

No. 576,697. Patented Feb. 9, 1897.

WITNESSES:
Henry F. Dobbin.
Henry S. Reade

INVENTORS
Richard Routh
William J. Dwyer
Oswald R. Routh
By James A. Whitney
ATTORNEY

UNITED STATES PATENT OFFICE.

RICHARD ROUTH, WILLIAM J. DWYER, AND OSWALD R. ROUTH, OF JERSEY CITY, NEW JERSEY.

ELASTIC TIRE FOR VEHICLES.

SPECIFICATION forming part of Letters Patent No. 576,697, dated February 9, 1897.

Application filed July 17, 1895. Serial No. 556,300. (No model.)

*To all whom it may concern:*

Be it known that we, RICHARD ROUTH, WILLIAM J. DWYER, and OSWALD R. ROUTH, of Jersey City, in the county of Hudson and State of New Jersey, have invented certain new and useful Improvements in Elastic Tires for Vehicles; and we do hereby declare that the following is a full, clear, and exact description of the same, reference being had to the accompanying drawings, making a part of this specification, in which—

Figure 1:
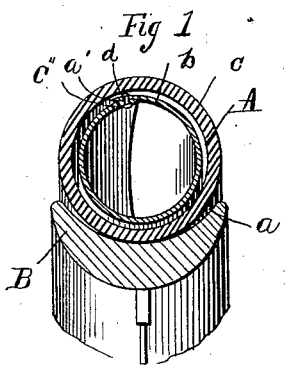
Figure 2:
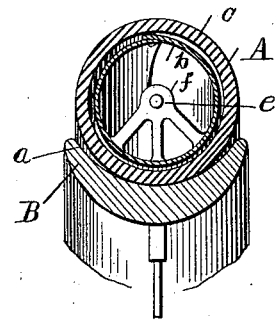
Figure 3:
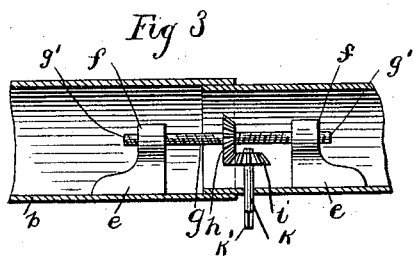
Figure 4:
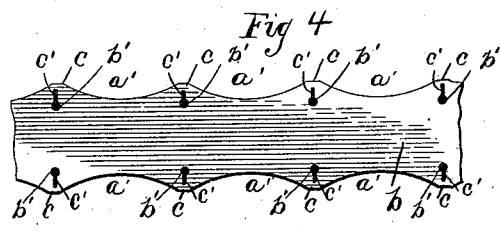
Figure 5:
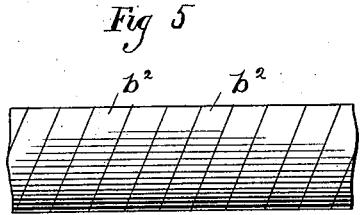
Figure 6:
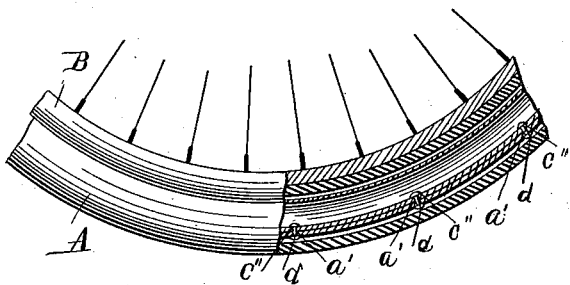

Figure 1 is a transverse sectional view of a tire made according to our invention. Fig. 2 is a like view taken through another portion of the tire. Fig. 3 is a longitudinal sectional view of a portion of said tire. Fig. 4 is a detail view showing a blank from which the resilient tube which forms an element in our invention may be made. Fig. 5 is a side view illustrating a modified construction of said tube. Fig. 6 is a side view of a wheel having said tire.

This invention is more especially designed for use in bicycles, but may be employed in other wheeled vehicles. Its object is to provide an elastic tire which will not be liable to injury by perforation or puncture when in use, and which by its resilience, resistance to puncture, freedom from accidental injury, and strength and durability will more successfully meet the adverse conditions of actual and practical employment than has been found possible with other structures for like purposes prior to our invention.

The normal shape of the tire A in cross-section is substantially that of an ordinary pneumatic tire. The rim B of the wheel may be of wood or metal and circumferentially concaved or grooved, as at $a$, in a manner well known in the art. The cross-section of this groove should be upon an arc of greater diameter than that of the tire A to permit the lateral resiliency or spread of the latter when flattened by contact with the surface upon which it runs. The wheel itself may of course be of any usual or suitable construction.

The central part of the tire is formed by a resilient metal tube $b$ and its outer part by a jacket or tube $c$ of any suitable fabric or material, the resilient metal tube being placed within the jacketing-tube, so that any interstices, if such there be, in the metal tube are covered by the jacketing-tube, so that the latter prevents the entrance into the metal tube of sand, dirt, or other extraneous substances. When the tire is to have the properties of a pneumatic tire, the jacketing-tube should be made of india-rubber or other suitable material practically impervious to the passage of air.

It is necessary for the purposes of our invention that the resilient metal tube, when in position encircling the rim of the wheel, shall be elastic in directions radial to the axis of the wheel; that is to say, capable, in the rotation of the wheel, of yielding to pressure against the surface upon which the wheel is run and of resuming its original form when released from such pressure. This flattening of the tire at its point or place of contact with the surface traversed by the wheel is permitted by the resiliency of the tube in lateral directions as well as in directions radial to the axis of the wheel. To secure this, we construct the metallic tube B from a blank (shown in Fig. 4) of cold-drawn tempered sheet or ribbon steel, so that said tube is, in fact, composed throughout its length of continuous sheet metal, the opposite ends of the blank when the latter is folded to shape constituting the opposing ends of the tube. This blank has its two opposite edges scalloped or recessed, as shown at $a'$, thereby providing lugs $c$, the lugs $c$ at one edge of the blank being opposite those at the other. In each lug is a slot $c'$, at the inner end of which is an enlarged opening or hole $b'$. When the blank is folded to bring the lugs $c$ at its one edge upon those at the other, the holes $b'$ in the series of lugs at the one edge are brought coincident with those in the lugs at the opposite edge, the cross-section of the tube thus formed being circular, or practically so. Double-headed bolts $d$ or equivalent fastening devices are then slipped into the holes of each pair of opposing lugs, and the blank being released from the pressure which has held the holes coincident the radial elasticity of the metal brings the stem $a''$ of each bolt $d$ into the coincident slots $c'$, the heads $c''$ of the bolts holding the adjacent lugs together, while the slots permit the play of the lugs one upon another as the cross-section of the tube, formed, as described, from the blank, is modified by pressure or other condition of use.

The resilient tube must of course be bent to conform to the circumference of the wheel and its two ends are to be suitably connected together. For this purpose we make one end of said tube of somewhat diminished diameter, so that it may be thrust into the opposite end thereof. In each of said ends we provide a bracket $e$, securely attached to the interior of the tube and carrying a fixed nut $f$. The screw-threads of these two nuts run in opposite directions.

A screw-bolt $g$ is provided with corresponding screw-threads at its opposite end portions $g'$, which work in the adjacent nuts $f$. At the middle of this screw-bolt is a bevel-pinion $h$, into which gears another pinion $i$ upon the end of a stem or shaft $k$, which extends through the rim of the wheel and which may be turned by a small winch or wrench applied to its projecting end $k'$. By thus turning the pinion $i$ the pinion $h$ is actuated to rotate the screw-bolt, which, acting like a turnbuckle in the nuts $f$, not only connects the two ends of the tube, but enables the latter to be contracted and rigidly adjusted into its place in the groove or concavity of the rim and retained with any desired degree of snugness therein.

The jacketing-tube may be applied over or external to the resilient metal tube in any suitable way. Thus, for example, it may be slipped over the said tube prior to the attachment of the same in place upon the rim, as just explained. When it is desired to add the properties or structure of a pneumatic tire to those of the resilient tire, the jacketing-tube may be of material suitably impervious to the passage of air and provided with the usual means of inflation. It will be seen, however, that our invention does not depend for its operation upon the operative principles of a pneumatic tire, but upon the resiliency, impenetrability, and strength of the elastic metallic tube, which, formed, arranged, and applied as a tire to the wheel, yields radially as to the center of the wheel and expands laterally as concerns its own diameter when it is brought under pressure against the surface upon which the wheel is run and by reason of this resiliency resumes its normal shape and condition when removed from such pressure. Inasmuch as the metal tube is formed of continuous sheet metal from end to end it is practically proof against puncture, and as its resiliency substitutes that of the cushioned and pneumatic tires it follows that our invention, as compared with these, possesses merits and advantages of a greatly superior order, although, as hereinbefore explained, the outer or jacketing tube employed in our invention may, when desired, be made to act additionally, so far as may be, after the manner of a pneumatic tire.

In order to permit of the lateral resilience of the metal tube $b$, the rim is concaved or grooved on an arc of a circle of greater radius than that of the tire, as above stated, and since the tube is practically inelastic circumferentially it requires no outer tube inclosing the edges of the rim to hold said tube in place in the enlarged concavity.

What we claim as our invention is—

1. The combination of an outer tube or jacket $a$, an inner circumferentially continuous metal tube $b$ which is resilient laterally, means for rigidly connecting the opposite ends of said tube to render it practically inelastic circumferentially, and a rim concaved or grooved on an arc of greater radius than that of the tire, the construction being such that the tube and its jacket are retained in place in the concavity of the rim by the rigid connection of the ends of the metal tube, substantially as and for the purpose set forth.

2. In an elastic tire the combination with a resilient metal tube having one of its ends inserted in the other, of the nuts, $f$, screw-bolt, $g$, pinions placed within said tube for turning said screw-bolt to adjust, tighten and loosen the tube upon the rim, and a stem extended outward through the tire from said pinions to actuate the latter substantially as herein set forth.

3. In an elastic tire the combination with a metallic tube composed of a sheet-metal blank continuous from end to end, folded into circular or practically circular cross-section, provided at its opposing edges with slotted lugs, and having its ends thrust one into the other, of devices for connecting the lugs of the one edge with those of the other to unite the same and yet permit a resilient action of the tube in lateral directions, substantially as and for the purpose herein set forth.

4. In an elastic tire the combination with a metallic tube composed of a sheet-metal blank continuous from end to end, folded into circular or practically circular cross-section, provided at its opposing edges with slotted coincident lugs, and with one of its ends thrust into the other, of rivets for connecting said lugs to permit lateral resiliency in the tube, and means for rigidly connecting the ends of the tube to firmly retain it upon the rim of the wheel, substantially as and for the purpose herein set forth.

5. A blank for a resilient tube for tires composed of elastic sheet or ribbon metal and having the slotted lugs, $c$, $c'$, arranged for connection by bolts or fastening devices, substantially as and for the purpose herein set forth.

RICHARD ROUTH.
WILLIAM J. DWYER.
OSWALD R. ROUTH.

Witnesses:
JNO. C. MCQUHAE,
HENRY S. READE.